Dec. 3, 1929.  E. F. RYAN ET AL  1,738,450
VALVE
Filed Dec. 13, 1928
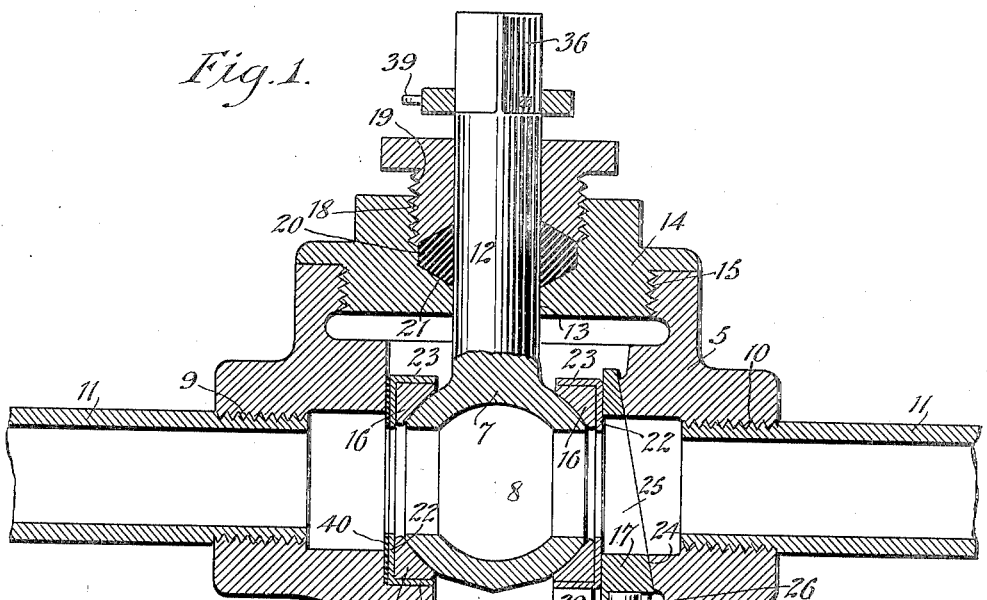
Fig.1.
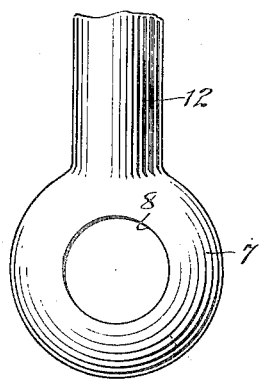
Fig.3.
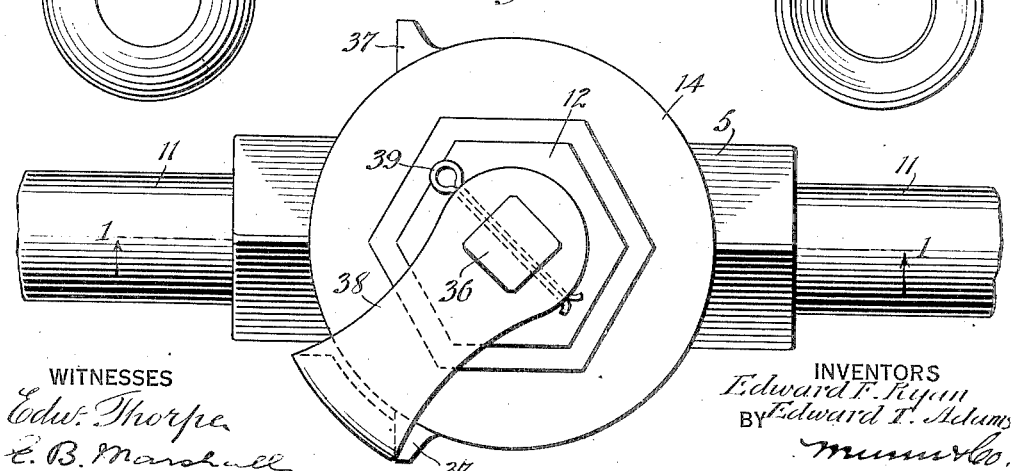
Fig.2.
Fig.4.
WITNESSES
Edw. Thorpe
E. B. Marshall
INVENTORS
Edward F. Ryan
BY Edward T. Adams
Munn & Co.
ATTORNEY Patented Dec. 3, 1929

1,738,450

UNITED STATES PATENT OFFICE

EDWARD F. RYAN, OF BINGHAMTON, AND EDWARD T. ADAMS, OF JOHNSON CITY, NEW YORK, ASSIGNORS TO THE FAIRBANKS COMPANY, OF NEW YORK, N. Y., A CORPORATION OF NEW JERSEY

VALVE

Application filed December 13, 1928. Serial No. 325,792.

This invention relates to valves, and particularly the type of valve which is known as the blow-off or quick-acting cock type employed on boiler blow-off lines, on lines carrying viscous fluids or gritty matter, and also where it would be advantageous to use a quick opening and closing type of valve that will be tight when closed and having a free, unobstructed, waterway opening equal to the normal size of the pipe on which the valve is to be applied.

The invention has for its object to provide a valve of the cock type having means adapted to adjust readily the seating members of the valve from the outside of the valve casing and while the valve is in operation, thus permitting the operation of the valve with the least necessary effort while holding the seating members in position to prevent leakage.

Another object of the invention is to provide a valve which is constructed in such a manner that the ball plug valve member, the seating members and the gaskets may be replaced without removing the valve from the pipe line.

Other objects of the invention are to provide a valve having a body made of one casting, and to provide casings for the seating members of the valve which prevent the seating members, which are usually made of asbestos, from sloughing off, the said casings also making it possible readily to remove the seating members from the valve body.

Additional objects of the invention will appear in the following specification in which the preferred form of the invention is described.

In the drawings, similar reference characters refer to similar parts in all the views, in which—

Figure 1 is a sectional view on the line 1—1 of Figure 2;

Figure 2 is a plan view showing the valve;

Figure 3 is a view showing the ball plug valve member with a part of the valve stem; and Figure 4 is a view showing the valve seating member and its casing.

The valve, which is the subject-matter of this application, is of the quick-acting cock type and is provided with a body cast preferably in one piece and having a wedge member operable from without the body and adapted to adjust the valve seating members relatively to the ball plug valve member to prevent leakage while avoiding undue pressure of the seating members against the ball plug valve member. While the drawings show a wedge member at one side of the valve, it will be understood that two wedge members may be provided, the construction with the wedge member at one side of the valve being duplicated at the other side of the valve. It will also be seen in the following description that the seating members are preferably contained in casings which serve to hold each seating member together as a unit, thereby preventing its disintegration and assisting in its removal and replacement. By referring to the drawings it will be seen that the valve body casing 5 is preferably cast in one piece and that this valve body casing 5 has an opening 6 in which the ball plug valve member 7 is disposed, the said ball plug valve member 7 having an opening 8 therethrough which is adapted to register with the oppositely disposed ports 9 and 10 in the valve body casing 5. Inasmuch as the opening 8 through the ball plug valve member 7 is substantially of the same diameter as the pipes 11, the threaded ends of which mesh with the threads in the ports 9 and 10, there will be an unobstructed passage of the fluid from one of the pipes 11 to the other pipe 11 through the valve body casing 5 and through the opening 8 in the ball plug valve member 7.

The ball plug valve member 7 has a valve stem 12 which extends through the opening 13 in the cap 14 which closes the opening 15 in the valve body casing 5. As shown in Figure 1 of the drawings, the cap 14 is threaded and this thread meshes with a thread in the opening 15 in the valve body casing 5. As the opening 15 is large, it is possible, by the removal of the cap 14, to readily adjust the ring seating members 16 and the wedge 17. It is also possible to readily replace the ring seating members 16 and the wedge 17 when desired. The cap 14 has a threaded opening 18 with which meshes a thread on the gland nut 19, the gland nut 19 serving to press against the packing 20 which is disposed in the opening 21 in the cap 14.

The ring seating members 16 are ring shaped and are enclosed by ring casings 22 which engage the outer faces or sides of the ring seating members 16 and which are provided with flanges 23 which engage the peripheries of the ring seating members 16. These ring casings 22 serve to hold the ring seating members 16 together and in place and serve to prevent the deterioration of the ring seating members 16 and also serve to assist in the ready removal of the ring seating members 16 through the opening 15 in the valve body casing 5.

An inner face 24 of the valve body casing 5 is inclined relatively to the passageways through the ports 9 and 10, and engaging this inner face 24 the wedge 17 is disposed, the wedge also engaging the adjacent ring casing 23 and serving to press the said ring casing 23 away from the port 10 and in the direction of the ball plug valve member 7, thereby forcing one of the ring seating members 16 against the ball plug valve member 7 and the ball plug valve member 7 against the other ring seating member 16. It will be understood that when the wedge 17 is moved upwardly, it will press the ball plug valve member 7 and the ring seating members 16 together; when the wedge 17 is moved downwardly relatively to the valve body casing 5, it will permit a freer movement of the ball plug valve member 7 relatively to the valve body casing 5. The wedge 17 has an opening 25 therethrough to permit the fluid to flow freely through the said wedge 17. In the bottom of the wedge 17 there is a recess 26 and below the recess 26 the wedge 17 has a slot 27 leading to the recess 26, there being disposed in the slot 27 a stud 28 having an enlargement 29 disposed in the recess 26, the stud 28 being articulated to the wedge 17 in this manner. The stud 28 has a thread 30 meshing in a threaded opening 31 in the valve body casing 5, and it will be understood that when the stud 28 is rotated it will serve to move the wedge 17 up for pressing the ball plug valve member 7 and the ring seating members 16 together as may be desired. The stud 28 is disposed through a stuffing box nut 32 which has a thread meshing with a thread 33 in an enlargement of the opening 31, the stuffing box nut 32 serving to press the packing 34 against the valve body casing 5 and the stud 28.

The outer end of the stud 28 is angular in cross-section, as shown at 35, so that it may be turned by a nut for the adjustment of the wedge 17, and the outer end of the valve stem 12 also is angular in cross-section, as shown at 36, so that any desired means may be mounted on the valve stem 12 for operating the ball plug valve member 7. It will be seen that the valve may be taken apart by means of the ordinary wrench and that any parts may be replaced as may be required. It will also be understood that the wedge 17 may be adjusted without discontinuing the flow of fluid from one of the pipes 11 through the valve to the other pipe 11, and it will also be seen that the ring seating members 16 with their casings may be replaced without removing the valve body casing 5 from the pipe line. Should occasion require, the wedge 17 may also be replaced without removing the valve body casing 5 from the pipe line.

Stops 37 preferably extend from the valve body casing 5 but, if desired, they may be extended from the cap 14 to be engaged by an arm 38 which is mounted on the valve stem 12 at its angular portion 36, the arm 38 being preferably held in place by a cotter pin 39. An operating lever (not shown) is also preferably mounted on the valve stem 12 at its angular portion 36, but, as has been explained, the valve stem 12 may be rotated by any desired means from a position where the arm 38 engages one of the stops 37 with the valve open to another position engaging the other stop 37 with the valve closed. If desired, the arm 38 may be secured to either of the stops 37 in any appropriate manner. A gasket 40 is preferably disposed at the port 9 in contact with the adjacent ring casing 22.

What we claim is:

1. In a valve, a casing, a seating member in the casing, the casing having an inner face inclined relatively to the normal position of the seating member and spaced from one side of the seating member, a valve member in the casing at the other side of the seating member, a wedge adjustable in the casing between the seating member and the inclined face of the casing to press the seating member against the valve member, means to move the wedge relatively to the casing and means to operate the valve member.

2. In a valve, a casing having ports and a face at the inner side of the casing adjacent one of the ports and inclined relatively to the passageway through the said ports, a valve member in the casing, a seating member in the casing between the valve member and the inclined face of the casing, a wedge between the said face of the casing and the seating member, the wedge having an opening therethrough for registering with the last-mentioned port means for operating the valve member and means for moving the wedge relatively to the casing.

3. In a valve, a casing having ports, a seating member in the casing, the casing having an inner face inclined relatively to the normal position of the seating member and spaced from one side of the seating member, a valve member in the casing at the other side of the seating member, a wedge adjustable in the casing between the seating member and the inclined face of the casing to press the seating member against the valve member, the casing having an opening through its outer wall with a transverse area greater than the parallel transverse area occupied by the seating member and the valve member, the said opening being unobstructed to permit the removal of the seating member and the valve member through the opening in the casing, a cap for closing the opening in the casing and having an opening therethrough, means to move the wedge relatively to the casing, the said means being spaced from the said openings to offer a free passage for the seating member and the valve member through the opening and means extending through the opening in the cap for operating the valve member.

4. In a valve, a casing having ports, a seating member in the casing, the casing having an inner face inclined vertically relatively to the normal position of the seating member and spaced from one side of the seating member, a valve member in the casing at the other side of the seating member, a wedge adjustable vertically in the casing between the seating member and the inclined face of the casing to press the seating member against the valve member, the casing having an opening through its upper wall with a transverse area greater than the parallel transverse area occupied by the seating member and the valve member, the said opening being unobstructed to permit the removal of the seating member and the valve member through the opening in the casing, a cap for closing the opening in the casing and having an opening therethrough, there being an opening through the bottom of the casing, means extending through the last-mentioned opening and articulated to the wedge for adjusting the wedge and means extending through the opening in the cap for operating the valve member.

5. In a valve, a casing having ports, a seating member in the casing, the casing having an inner face inclined vertically relatively to the normal position of the seating member and spaced from one side of the seating member, a valve member in the casing at the other side of the seating member, a wedge adjustable vertically in the casing between the seating member and the inclined face of the casing to press the seating member against the valve member, the casing having an opening through its upper wall with a transverse area greater than the parallel transverse area occupied by the seating member and the valve member, the said opening being unobstructed to permit the removal of the seating member and the valve member through the opening in the casing, the wedge having a recess adjacent its bottom extending through its outer surface adjacent the inclined face of the casing and with a slot extending from the recess through the bottom of the wedge and out through the said outer surface of the wedge to permit of the disengagement of the wedge from a stud by moving the wedge in the direction of the center of the casing after the valve member and the seating member have been removed therefrom, a cap for closing the opening in the casing and having an opening therethrough, there being an opening through the bottom of the casing and a stud disposed through the last-mentioned opening in the casing and through the slot in the wedge, the stud having an enlargement disposed in the recess and means extending through the opening in the cap for operating the valve member.

6. In a valve, a casing having ports with a face at the inner side of the casing adjacent one of the ports, a valve member in the casing, a seating member in the casing between the valve member and the said face of the casing, a wedge member disposed between the seating member and the said face of the casing and adjustable relatively to the casing for pressing the seating member away from the said face of the casing and against the valve member, the wedge member having a recess and a slot leading therefrom through an end of the wedge member, the slot and the recess extending through a side of the wedge member, there being an opening through the casing having a thread, a stud disposed in the opening and extending through the slot and with an enlargement disposed in the recess, it being possible to disengage the wedge member from the stud in the casing, the stud having a thread meshing with the first-mentioned thread and means for operating the valve member.

7. In a valve, a casing having opposite ports with a face at the inner side of the casing adjacent one of the ports, the face being inclined relatively to the longitudinal direction of the port, a ball plug valve member in the casing, the ball plug valve member having an opening therethrough, a seating member in the casing between the ball plug valve member and the said face of the casing, a wedge disposed between the seating member and the said face of the casing and adjustable relatively to the casing for pressing the seating member away from the said face of the casing and against the ball plug valve member, there being an opening through the wedge, the wedge having a recess and a slot leading therefrom through an end of the wedge, the slot and the recess extending through a side of the wedge, there being an opening through the casing having a thread, the stud extending through the slot with an enlargement disposed in the recess, it being possible to disengage the wedge from the stud in the casing, the stud having a thread meshing with the first-mentioned thread and means for rotating the ball plug valve member relatively to the casing.

8. In a valve, a casing having opposite ports, a valve member in the casing, the valve member having an opening therethrough, a seating member disposed between the valve member and one of the ports, a second seating member disposed between the valve member and the other port, a wedge disposed between one of the seating members and the casing at the adjacent port, there being an opening through the top of the casing which is larger than the area occupied by the valve member and the two seating members and which is unobstructed to permit the withdrawal of the valve member and the two seating members through the top of the casing, a cap for closing the opening in the casing, the cap having an opening, another opening in the casing, means extending through the last-mentioned opening for moving the wedge relatively to the casing for pressing one of the seating members against the valve member and means extending through the opening in the cap to operate the valve member.

9. In a valve, a casing having ports, a valve member in the casing, means to operate the valve member, a ring seating member engaging the valve member and disposed between the valve member and one of the ports, a ring casing at the outer side of the ring seating member and having a flange engaging the periphery of the ring seating member, the first casing having an opening above the valve member and the ring casing and being unobstructed to permit the removal of the valve member and the ring casing with the ring seating member through the said opening, a wedge disposed between the ring casing and the inner surface of the first-mentioned casing for pressing the ring seating member against the valve member, means to move the wedge relatively to the first-mentioned casing, a cap for closing the opening in the first-mentioned casing, the cap having an opening and means extending through the opening in the cap for operating the valve member.

10. In a valve, a casing having ports with a face at the inner side of the casing adjacent one of the ports, a valve member in the casing, a seating member in the casing between the valve member and the said face of the casing, a wedge member disposed between the seating member and the said face of the casing and adjustable relatively to the casing for pressing the seating member away from the said face of the casing and against the valve member, means for operating the valve member, there being an opening through the casing spaced from the said means, the opening having a thread, there being a recess in the wedge member adjacent an end of the wedge member and a slot extending from the recess through the said end of the wedge member, the recess and the slot extending through the side of the wedge member which is disposed at the said face of the casing, a stud disposed in the opening in the said casing and in the slot, the stud having an enlargement disposed in the recess and a thread meshing with the first mentioned thread.

11. In a valve, a casing having ports with a face at the inner side of the casing adjacent one of the ports, a valve member in the casing, a seating member in the casing between the valve member and the said face of the casing, a wedge member disposed between the seating member and the face of the casing and adjustable relatively to the casing for pressing the seating member away from the said face of the casing and against the valve member, means for operating the valve member, there being an opening through the casing spaced from the said means, the opening having a thread and a stud disposed in the opening and articulated to the said wedge member, the stud having a thread meshing with the first mentioned thread.

EDWARD F. RYAN.
EDWARD T. ADAMS.